United States Patent
Lu et al.

(10) Patent No.: US 11,720,486 B2
(45) Date of Patent: Aug. 8, 2023

(54) MEMORY DATA ACCESS APPARATUS AND METHOD THEREOF

(71) Applicant: REALTEK SEMICONDUCTOR CORPORATION, Hsinchu (TW)

(72) Inventors: Yen-Ju Lu, Hsinchu (TW); Chao-Wei Huang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 45 days.

(21) Appl. No.: 16/990,926

(22) Filed: Aug. 11, 2020

(65) Prior Publication Data

US 2021/0173772 A1 Jun. 10, 2021

(30) Foreign Application Priority Data

Dec. 9, 2019 (TW) .................................. 108144948

(51) Int. Cl.
*G06F 12/02* (2006.01)
*G06F 12/14* (2006.01)
(Continued)

(52) U.S. Cl.
CPC ...... *G06F 12/0246* (2013.01); *G06F 9/30105* (2013.01); *G06F 12/0848* (2013.01); *G06F 12/1441* (2013.01); *G06F 13/4068* (2013.01)

(58) Field of Classification Search
CPC ............. G06F 12/1441; G06F 12/0848; G06F 12/0864; G06F 13/4068; G06F 12/126;
(Continued)

(56) References Cited

U.S. PATENT DOCUMENTS 7,114,031 B2    9/2006  Lin et al.
8,051,239 B2 *  11/2011 Nieminen ......... H03M 13/6558
                                              711/157
(Continued)

FOREIGN PATENT DOCUMENTS

EP    3129890 B1 *  8/2019 ......... G06F 12/0864
GB    2526849 A  * 12/2015 ......... G06F 12/0804
(Continued)

OTHER PUBLICATIONS

L. Alvarez, L. Vilanova, M. Gonzàlez, X. Martorell, N. Navarro and E. Ayguadé, "Hardware-Software Coherence Protocol for the Coexistence of Caches and Local Memories," in IEEE Transactions on Computers, vol. 64, No. 1, pp. 152-165, Jan. 2015.*
(Continued)

*Primary Examiner* — Pierre Michel Bataille
(74) *Attorney, Agent, or Firm* — WPAT, P.C., Intellectual Property Attorneys; Anthony King

(57) ABSTRACT

The present disclosure provides a memory data access apparatus and method thereof. The memory data access apparatus includes a cache memory and a processing unit. The processing unit is configured to: execute a memory read instruction, wherein the memory read instruction includes a memory address; determine that access of the memory address in the cache memory is missed; determine that the memory address is within a memory address range, wherein the memory address range corresponds to a data access amount; and read data blocks corresponding to the data access amount from the memory address of a memory.

16 Claims, 16 Drawing Sheets

(51) Int. Cl.
*G06F 9/30* (2018.01)
*G06F 13/40* (2006.01)
*G06F 12/0846* (2016.01)

(58) Field of Classification Search
CPC .. G06F 12/0246; G06F 9/383; G06F 9/30105; G06F 2212/601; G06F 2212/6082; G06F 12/02; G06F 12/0846; G06F 12/14; G06F 13/40; G06F 9/30
See application file for complete search history.

(56) References Cited

U.S. PATENT DOCUMENTS

| | | | | |
|---|---|---|---|---|
| 8,607,023 | B1* | 12/2013 | Kraipak | G06F 1/3275 |
| | | | | 711/170 |
| 10,817,199 | B2* | 10/2020 | Cho | G06F 15/781 |
| 2003/0200408 | A1* | 10/2003 | Mekhiel | G06F 12/0888 |
| | | | | 711/167 |
| 2012/0221774 | A1* | 8/2012 | Atkisson | G06F 12/0895 |
| | | | | 711/135 |
| 2014/0181412 | A1* | 6/2014 | Thottethodi | G06F 12/0848 |
| | | | | 711/133 |
| 2016/0170886 | A1* | 6/2016 | Ma | G06F 12/084 |
| | | | | 711/122 |
| 2017/0315921 | A1* | 11/2017 | Hooker | G06F 12/123 |
| 2018/0357175 | A1* | 12/2018 | Jiang | G06F 12/0888 |

FOREIGN PATENT DOCUMENTS

| | | | |
|---|---|---|---|
| TW | 569219 | 1/2004 | |
| WO | WO-2004015560 A2 * | 2/2004 | G06F 12/0864 |

OTHER PUBLICATIONS

D. Crisu, "An architectural survey and modeling of data cache memories in Verilog HDL," CAS '99 Proceedings. 1999 International Semiconductor Conference (Cat. No.99TH8389), Sinaia, Romania, 1999, pp. 139-142.*

H. Vandierendonck and K. De Bosschere, "An Address Transformation Combining Block- and Word-Int erleaving," in IEEE Computer Architecture Letters, vol. 1, No. 1, pp. 8-8, Jan. 2002.*

U.S. Pat. No. 7,114,031 is the corresponding application to Foreign Reference TW 569219.

* cited by examiner

|   | TAG_a | TAG_b | TAG_c | TAG_d |
|---|---|---|---|---|
| 0 | | | | |
| 1 | | | | |
| 2 | | | | |
| 3 | | | | |
| 4 | | | | |
| 5 | | | | |
| 6 | | | | |
| 7 | | | | |

FIG. 1D

MEMORY DATA ACCESS APPARATUS AND METHOD THEREOF

CROSS REFERENCE TO RELATED APPLICATIONS

This application claims priority of Taiwan application No. 108144948 filed on Dec. 9, 2019, which is incorporated by reference in its entirety.

BACKGROUND

Field of the Invention

The present invention relates generally to a memory data access apparatus and method thereof, more particularly, to a memory data access apparatus and method thereof for cache memory.

Description of Related Art

In conventional computer architectures, a cache memory is primarily disposed between a processing unit and a general memory (e.g., a random-access memory). When the processing unit executes the memory read instruction, it may first search the cache memory that has a faster access speed to determine whether there is the corresponding data. If yes, the processing unit may read the desired data directly in the cache memory; in other words, the processing unit does not have to search for the desired data in the general memory that has a slower access speed, thereby saving the read time. If not, the processing unit has to resort to the general memory that has a slower access speed so as to read the desired data.

Nonetheless, since the cache memory has a higher cost and relatively limited storage space, the utilization of the cache memory and the contents stored therein shall be disposed properly, so as to increase the overall access efficiency.

BRIEF SUMMARY OF THE INVENTION

Some embodiments of the present invention provide a memory data access method, including: executing a memory read instruction, wherein, the memory read instruction includes a memory address; determining that access of the memory address in the cache memory is missed; determining that the memory address is within a memory address range, wherein, the memory address range corresponds to a data access amount; and reading data blocks corresponding to the data access amount from the memory address of a memory.

Some embodiments of the present invention provide a memory data access apparatus. The memory data access apparatus includes a cache memory and a processing unit. The processing unit is configured to: execute a memory read instruction, wherein the memory read instruction includes a memory address; determine that access of the memory address in the cache memory is missed; determine that the memory address is within a memory address range, wherein the memory address range corresponds to a data access amount; and read data blocks corresponding to the data access amount from the memory address of a memory.

BRIEF DESCRIPTION OF THE DRAWINGS

Aspects of the present invention are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 1D is a schematic diagram of a cache way of a cache memory according to some embodiments of the present invention.

DETAILED DESCRIPTION

Embodiments of the present invention are discussed in detail below. It should be appreciated, however, that the present invention provides many applicable inventive concepts that can be embodied in a wide variety of specific contexts. The specific embodiments discussed are merely illustrative and do not limit the scope of the disclosure.

Conventionally, when the cache memory read encounters the cache miss, it will read the data of a fixed size in the general memory; therefore, it is less flexible in terms of utilization. The present invention provides a memory data access apparatus and method, which may, depending on needs, dynamically adjust the size of the data that should be read in the general memory, so as to increase the utilization flexibility greatly.

Figure 1A:
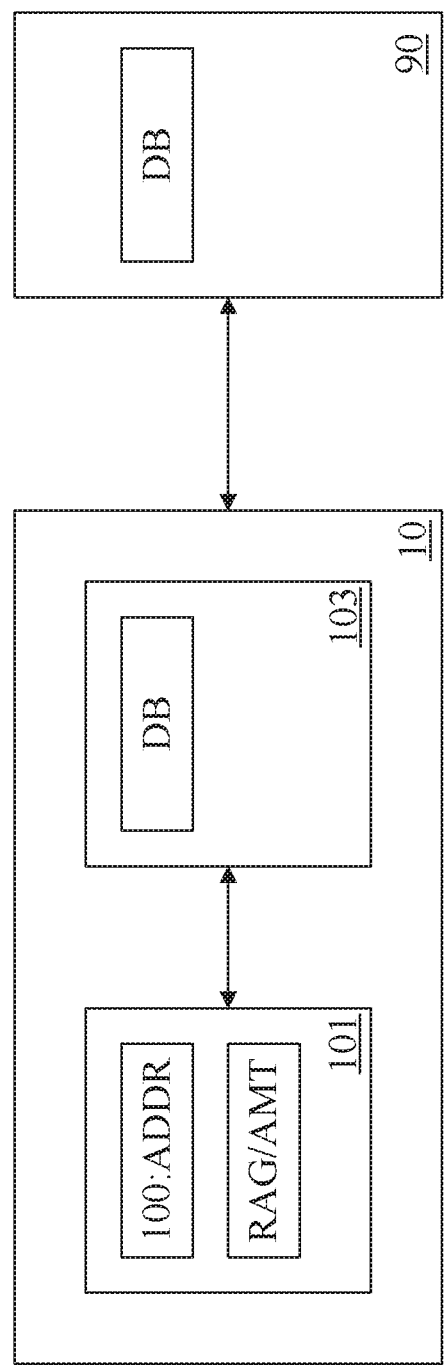
FIG. 1A is a block diagram of a memory data access apparatus according to some embodiments of the present invention.

Please refer to FIG. 1A, which is a block diagram of a memory data access apparatus 10 according to some embodiments of the present invention. The memory data access apparatus 10 includes a processing unit 101 and a cache memory 103. In some embodiments, the processing unit 101 is electrically coupled to the cache memory 103 for transmitting data and signals. In some embodiments, the memory data access apparatus 10 is electrically coupled to a memory 90 for transmitting data and signals. The relevant access operation of the memory data is discussed below in details.

Specifically, when the processing unit 101 needs to access data in the memory 90, the processing unit 101 executes a memory read instruction 100. In this case, the memory read instruction 100 includes a memory address ADDR. Then, before accessing the memory 90, the processing unit 101 determines whether there is data corresponding to the memory address ADDR in the cache memory 103 with a faster access speed. If yes, the access of the cache memory 103 is a cache hit, and the processing unit 101 reads the data corresponding to the memory address ADDR directly in the cache memory 103.

On the other hand, if the processing unit 101 determines that the cache memory 103 does not have data corresponding to the memory address ADDR; it means that the access of the cache memory 103 is a cache miss; in other words, the processing unit 101 determines that the memory address ADDR encounters the cache miss during the cache memory read, then the processing unit 101 needs to perform a read operation further to the memory 90.

Specifically, the processing unit 101 determines whether the memory address ADDR is within a memory address range RAG. If not, the processing unit 101 reads a data block DB having the size of a single cache line at the memory address ADDR of the memory 90, and writes it into the cache memory 103, so that the processing unit 101 can access the data corresponding to the memory address ADDR in the cache memory 103 later.

On the other hand, the memory address range RAG corresponds to an data access amount AMT, and if the processing unit 101 determines that the memory address ADDR is within the memory address range, the processing unit 101 reads data block DB corresponding to the data access amount AMT at the memory address ADDR of the memory 90, and writes the data block DB into the cache memory 103. In some embodiments, the data access amount AMT is at least twice the size of the cache line.

Figure 1B:
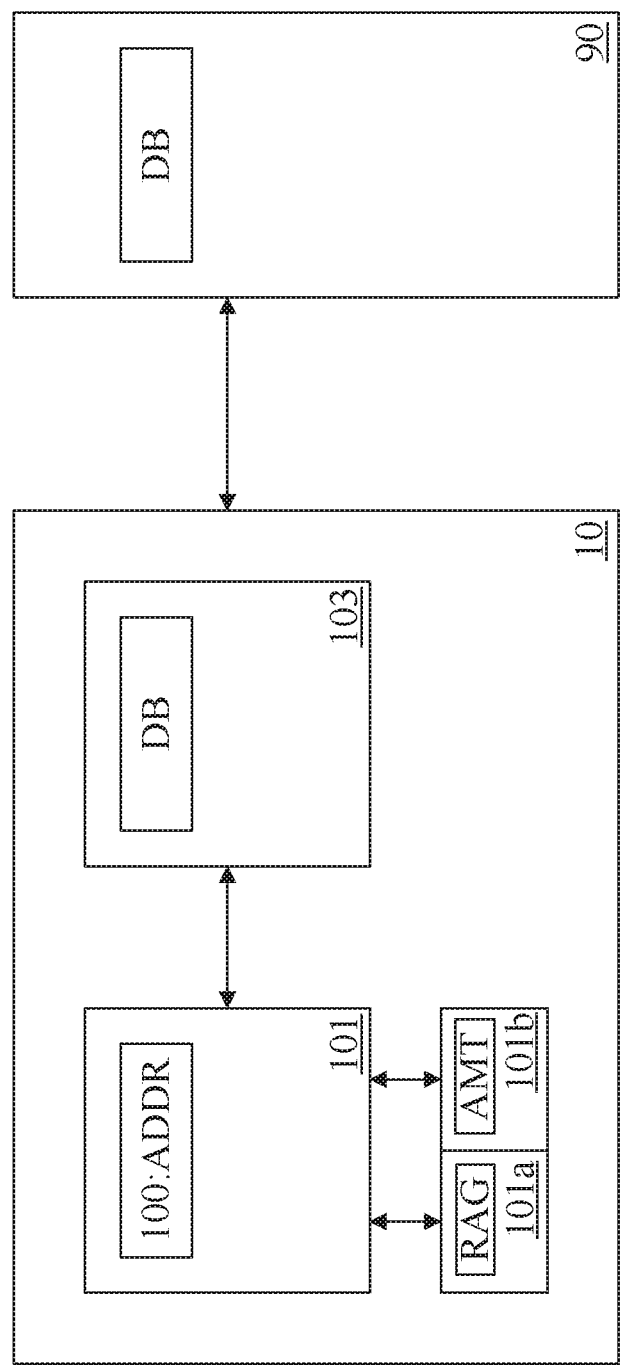
FIG. 1B is a block diagram of a memory data access apparatus according to some embodiments of the present invention.

In some embodiments, the memory address range RAG and its corresponding data access amount AMT are predetermined and stored in at least one register. Please refer to FIG. 1B; in some embodiments, the memory data access apparatus 10 further includes a register 101a and a register 101b, electrically coupled to the processing unit 101. The register 101a is configured to store the memory address range RAG, and the register 101b is configured to store the data access amount AMT.

Figure 1C:
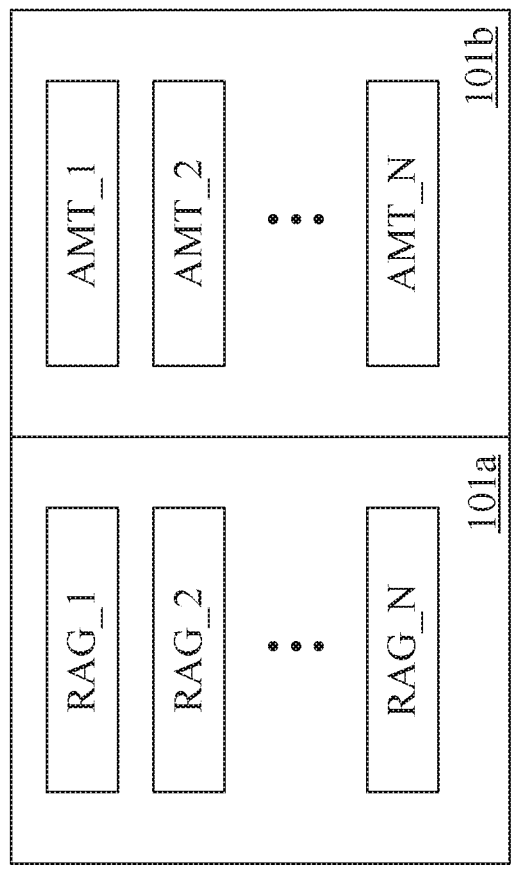
FIG. 1C is a schematic view of a register according to some embodiments of the present invention.

Please refer to FIG. 1C, in some embodiments, the register 101a stores a plurality of memory address ranges RAG_1 to RAG_N, and the register 101b stores a plurality of amounts of data access AMT_1 to AMT_N. In this case, the plurality of memory address ranges RAG_1 to RAG_N and the plurality of amounts of data access AMT_1 to AMT_N correspond to each other one-to-one. Accordingly, when the processing unit 101 determines that the memory address ADDR is within the memory range RAG_n, the processing unit 101 can read the data block DB corresponding to the data access amount AMT_n from the memory address ADDR of the memory 90.

Figure 1D:
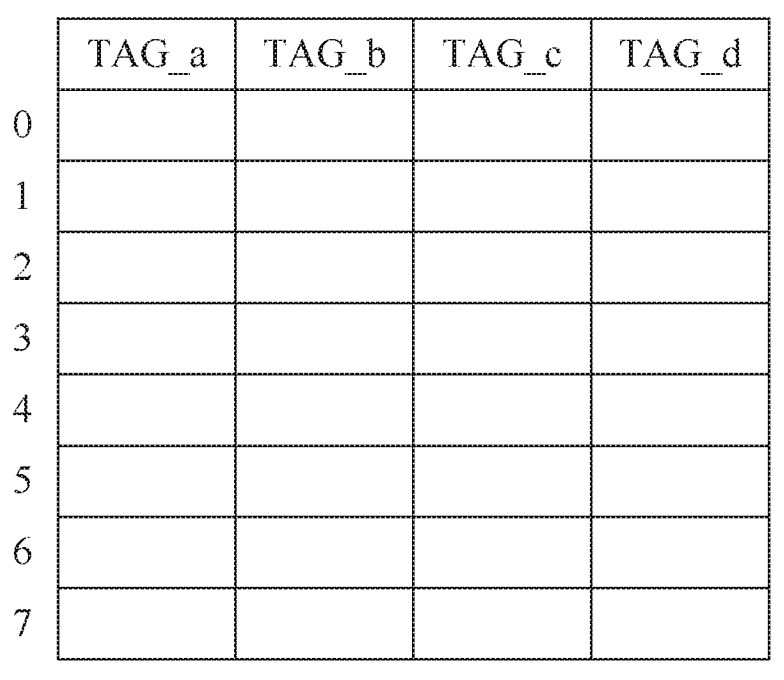

In some embodiments, the operation of writing the data block DB into the cache memory 103 may further include more detailed operations. Please refer to FIG. 1D, which is a schematic diagram of the cache way of the cache memory 103 according to some embodiments of the present invention. In this case, the cache memory 103 includes a plurality of cache ways TAG_a to TAG_d. Each cache way has fields of 0 to 7.

When the processing unit 101 determines that the memory address ADDR is within the memory address range RAG, the processing unit 101 selects a cache way (e.g., the cache way TAG_b) from a plurality of cache ways TAG_a to TAG_d. In the meantime, the processing unit 101 divides the data block DB into a plurality of line data DB_1 to DB_3. In this case, the size of each line data is the same as the size of each cache line, and the line data DB_1 to DB_3 have the corresponding memory addresses ADDR_1 to ADDR_3.

Next, the processing unit 101 sequentially determines whether or not writing the line data DB_1 to DB_3 into the selected cache memory 103. Specifically, for each line data, the processing unit 101 determines whether the corresponding memory address is stored in any cache way of the cache memory 103. If not, the processing unit 101 writes the corresponding memory address into the selected cache way and writes this line data into the corresponding location of the cache memory 103.

If the processing unit 101 determines that the corresponding memory address is stored in one cache way of the cache memory 103, the processing unit 101 further determines whether the corresponding memory address is stored in the selected cache way. If yes, the processing unit 101 abandons this line data. If not, the processing unit 101 cleans the corresponding cache data in the cache memory 103. Then, the processing unit 101 writes the corresponding memory address into the selected cache way, and writes this line data into a corresponding location of the cache memory 103.

Figure 1E:
FIGS. 1E to 1G are schematic views of using a cache memory according to some embodiments of the present invention.

For example, please refer to FIG. 1E; regarding the cache way line data DB_1, the processing unit 101 determines that the corresponding memory address ADDR_1 is not stored in the cache memory 103. Therefore, the processing unit 101 writes the corresponding memory address ADDR_1 into the selected cache way, and writes the line data DB_1 into the corresponding location of the cache memory 103.

Figure 1F:

For example, please refer to FIG. 1F; regarding the line data DB_2, the processing unit 101 determines that the corresponding memory address ADDR_2 is stored in the cache way of the cache memory 103. Therefore, the processing unit 101 further determines that the corresponding memory address ADDR_2 is stored in the selected cache way. Hence, the processing unit 101 abandons the line data DB_2.

Figure 1G:

For example, please refer to FIG. 1G, regarding the line data DB_3, the processing unit 101 determines that corresponding memory address ADDR_3 is stored in the cache way of the cache memory 103. Therefore, the processing unit 101 further determines that the corresponding memory address ADDR_3 is not stored in the selected cache way. Hence, the processing unit 101 cleans the corresponding cache line data in the cache memory 103. Then, the processing unit 101 writes the corresponding memory ADDR_3 address into the selected cache way, and writes the line data DB_3 into the corresponding location of the cache memory 103.

Figure 2A:
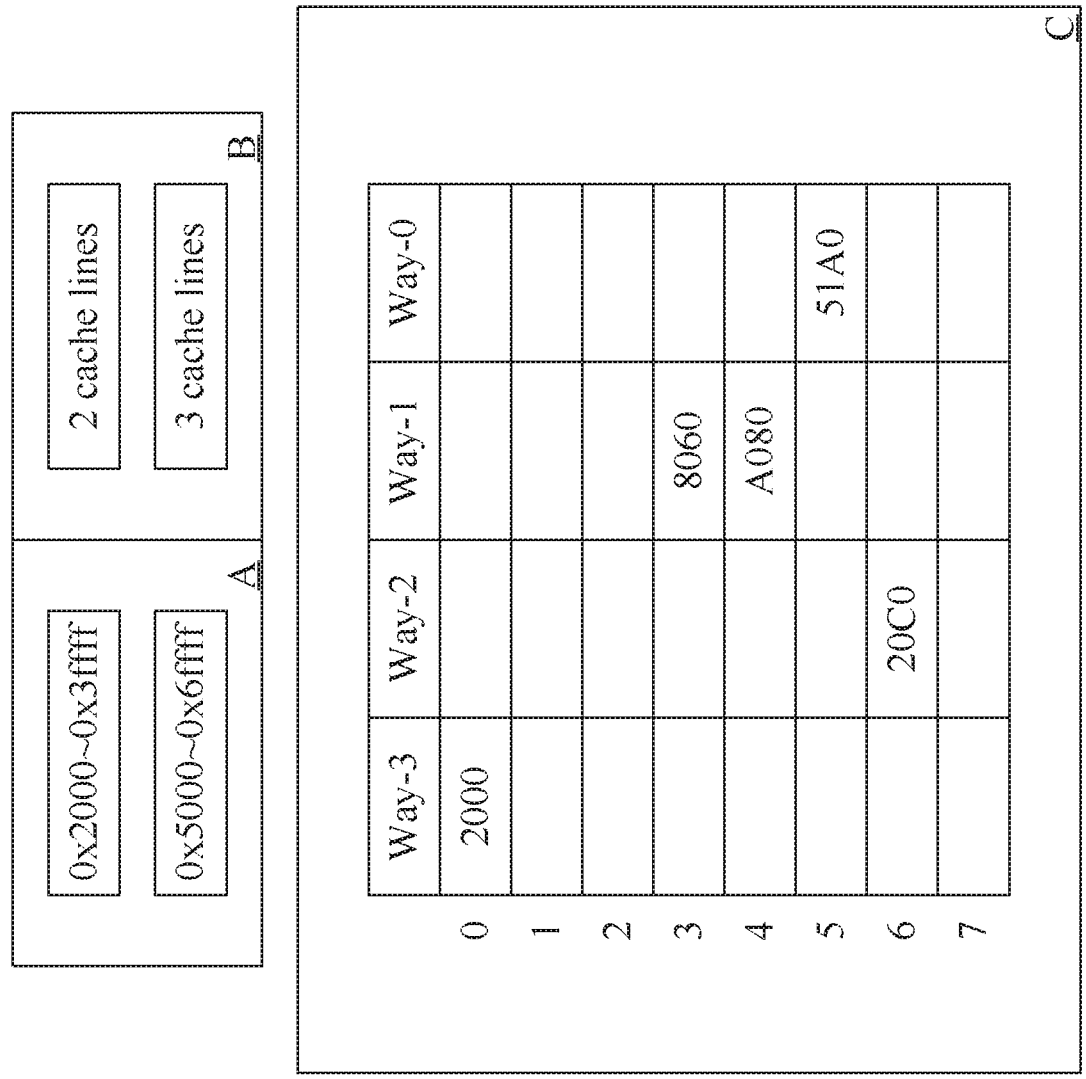
FIG. 2A is a schematic diagram of register and cache memory according to some embodiments of the present invention.

Other examples and figures are provided below to provide a more thorough description regarding the operation of writing the data block into the cache memory according to the present invention. Please refer to FIG. 2A, which is a schematic diagram of the register and cache memory of the present invention. The register A stores memory address ranges: 0x2000 to 0x3fff, and 0x5000 to 0x6fff, and the register B stores data access amounts: two cache lines and three cache lines. In this case, the memory address range of 0x2000 to 0x3fff correspond to the data access amount of two cache lines, and the memory address range of 0x5000 to x6fff corresponds to the data access amount of three cache lines.

On the other hand, the cache memory C includes a plurality of cache ways Way-0 to Way-3, and each cache way has fields of 0 to 7. In this case, as shown in the figures, the cache ways Way-0 to Way-3 have had a plurality of memory addresses of 2000, 8060, A080, 51A0 and 20C0 stored therein. It should be noted that the memory addresses of the above-mentioned cache way have corresponding data in the other portion of the cache memory C, and to facilitate the understanding of the technology of the present invention, these data are not shown; however, persons having ordinary skill in the art would understand it readily.

Figure 2B:
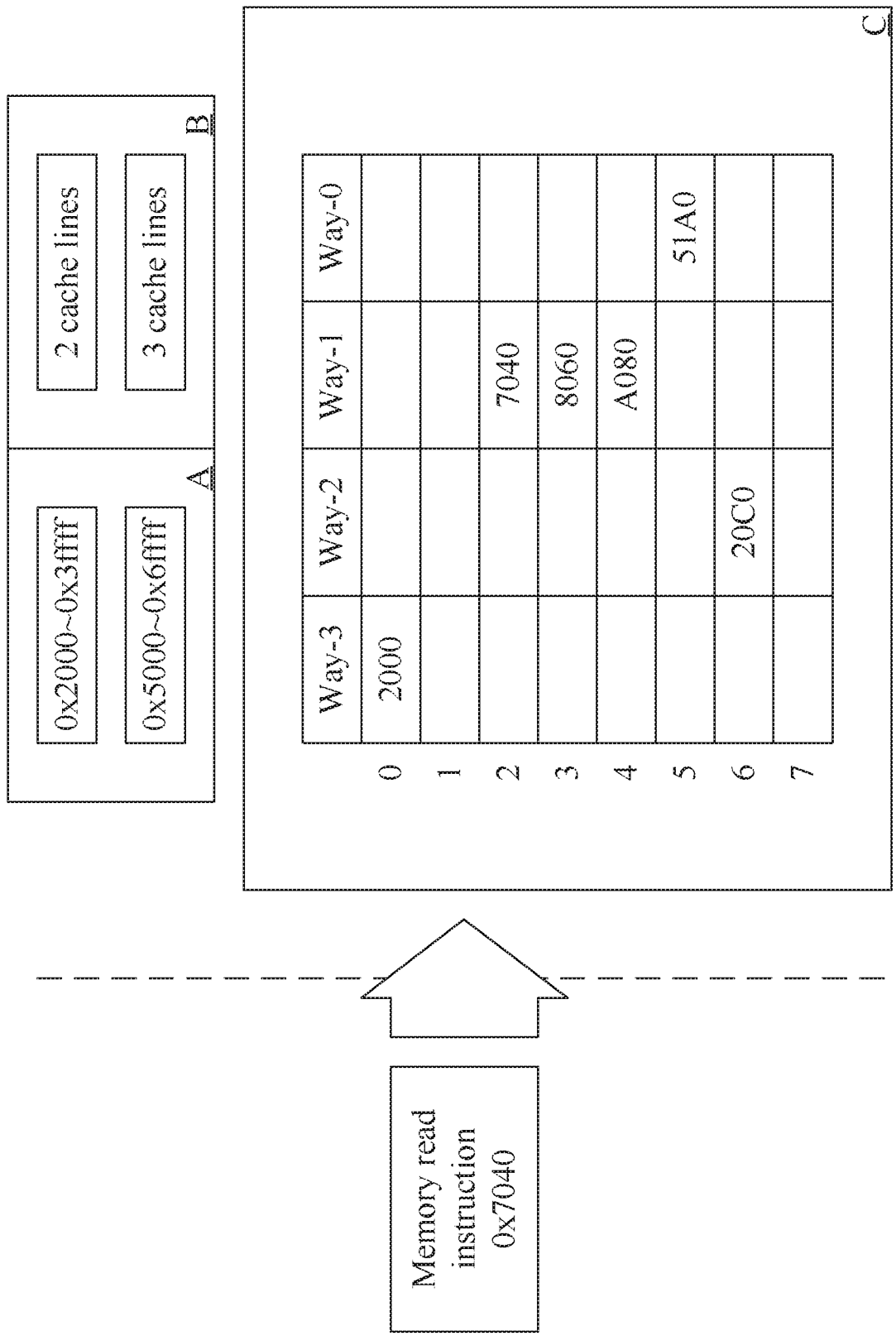
FIGS. 2B to 2F are schematic views of using register and cache memory according to some embodiments of the present invention.

Please refer to FIG. 2B, in which the memory read instruction includes the memory address of 0x7040, and the processing unit determines that the memory address of 0x7040 is not within the memory address range of 0x2000 to x3ffff or 0x5000 to 0x6ffff. Hence, the processing unit reads the data block having the size of a single cache line at the memory address of 0x7040 of the memory. Then, the processing unit selects the Way-1, and writes the corresponding memory address of 0x7040 into the Way-1. In the meantime, the processing unit writes the data block corresponding to the memory address of 0x7040 into cache memory.

Figure 2C:
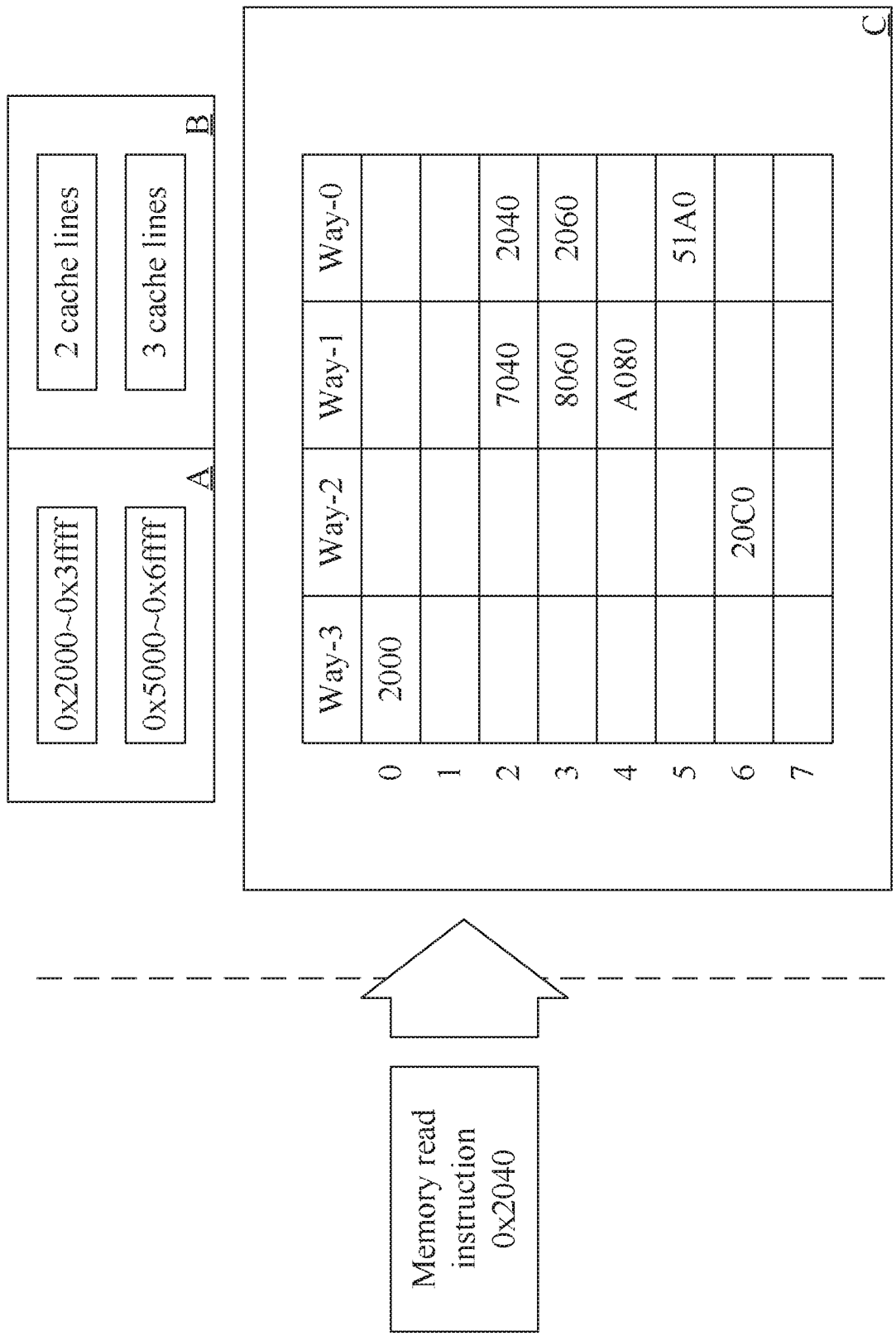

Please refer to FIG. 2C, in which the memory read instruction includes the memory address of 0x2040, and the processing unit determines that the memory address of 0x2040 is within the memory address range of 0x2000 to x3ffff. Hence, the processing unit reads the data block having the data access amount of two cache lines at the memory address 0x2040 of the memory. This data block can be divided into a data having a start address of 0x2040 and a size of one cache line, and a data having a start address of 0x2060 and a size of one cache line.

Then, the processing unit selects the Way-0, and writes the corresponding memory address of 0x2040 into the Way-0. In the meantime, the processing unit writes the data block corresponding to the memory address of 0x2040 into the cache memory. Subsequently, the processing unit determines that the memory address of 0x2060 is not stored in any cache way of the cache memory, and hence, the processing unit writes the corresponding memory address of 0x2060 into the Way-0. In the meantime, the processing unit writes the data block corresponding to the memory address of 0x2060 into cache memory.

Figure 2D:
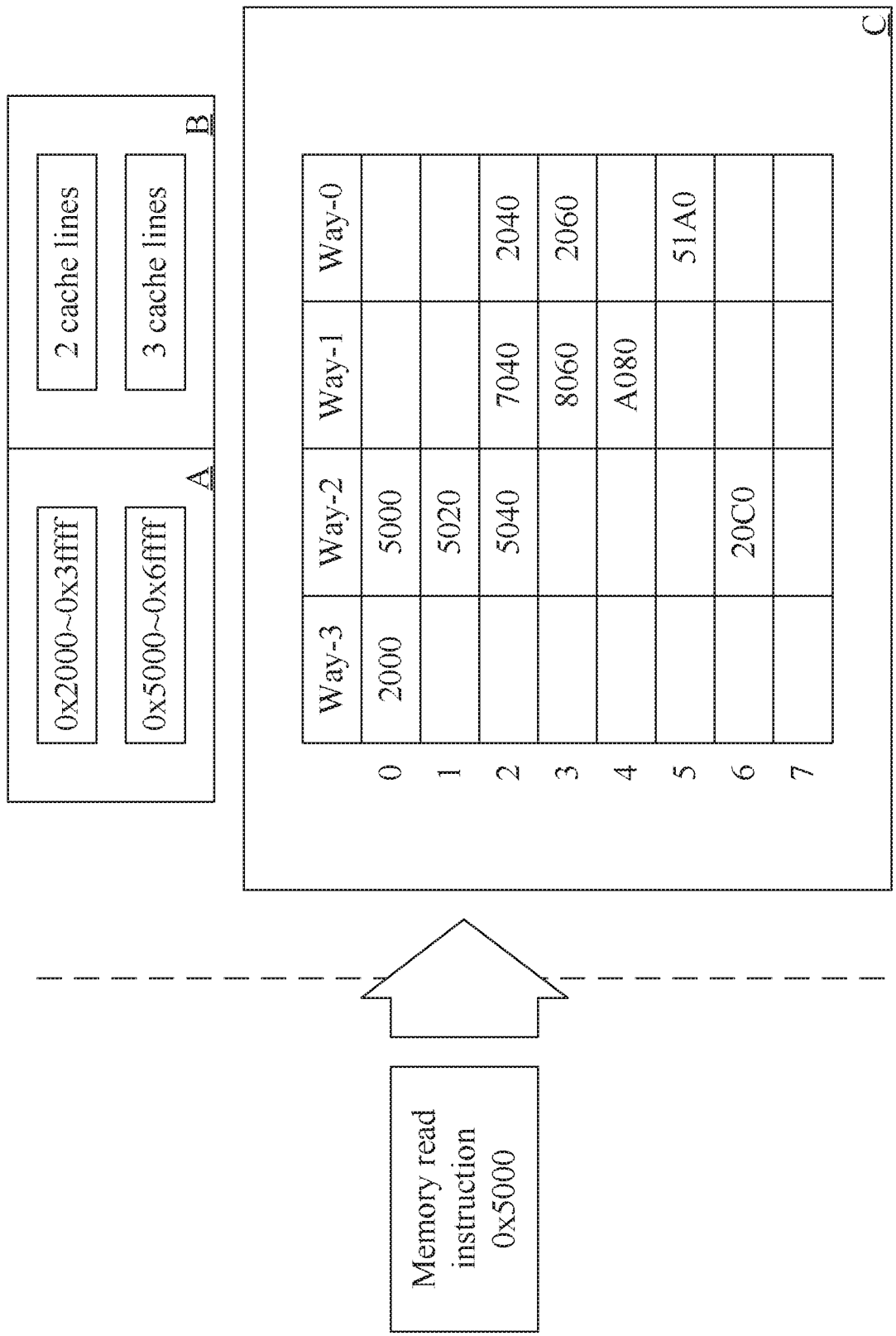

Please refer to FIG. 2D, in which the memory read instruction includes the memory address of 0x5000, and the processing unit determines that the memory address of 0x5000 is within the memory address range of 0x5000 to 0x6ffff. Hence, the processing unit reads the data block having the data access amount of three cache lines at the memory address 0x5000 of the memory. This data block can be divided into a data having a start address of 0x5000 and the size of one cache line, a data having a start address of 0x5020 and the size of one cache line, and a data having a start address of 0x5040 and the size of one cache line.

Next, the processing unit selects the Way-2, and writes the corresponding memory address 0x5000 into the Way-2. In the meantime, the processing unit writes the data block corresponding to memory address 0x5000 into the cache memory. Subsequently, the processing unit determines that the memory address of 0x5020 does not exist in any cache way of the cache memory, and hence, the processing unit writes the corresponding memory address of 0x5020 into the Way-2. In the meantime, the processing unit writes the data block corresponding to the memory address of 0x5020 into the cache memory.

Then, the processing unit determines that the memory address of 0x5040 does not exist in any cache way of the cache memory, and hence, the processing unit writes the corresponding memory address of 0x5040 into the Way-2. In the meantime, the processing unit writes the data block corresponding to the memory address of 0x5040 into the cache memory.

Figure 2E:
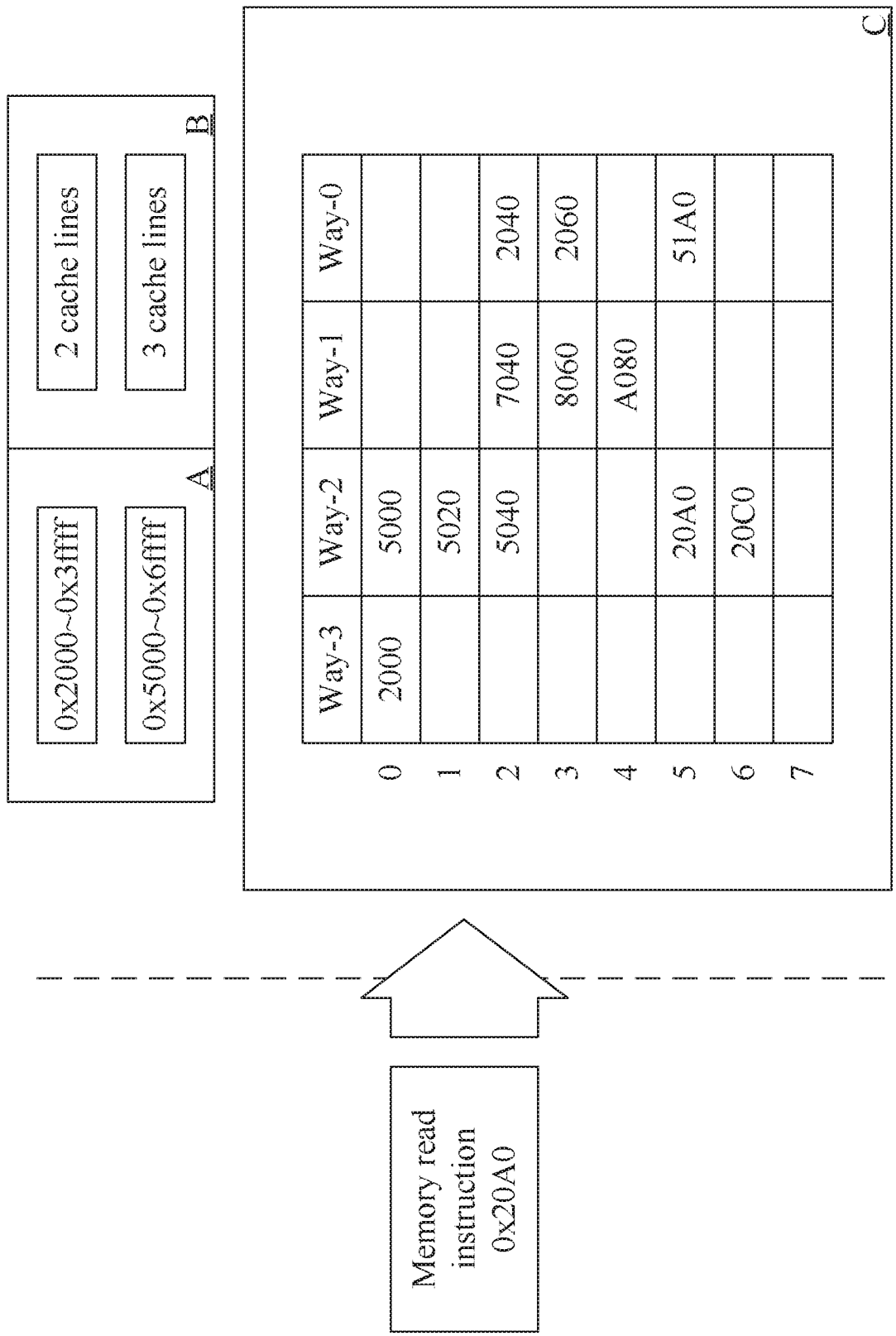

Please refer to FIG. 2E, in which the memory read instruction includes the memory address of 0x20A0, and the processing unit determines that the memory address 0x20A0 is within the memory address range of 0x2000 to x3ffff. Hence, the processing unit reads the data block having the data access amount of two cache lines at the memory address 0x20A0 of the memory. This data block can be divided into a data having a start address of 0x20A0 and the size of one cache line, and a data having a start address of 0x20C0 and the size of one cache line.

Next, the processing unit selects the Way-2, and writes the corresponding memory address of 0x20A0 into the Way-2. In the meantime, the processing unit writes the data block corresponding to the memory address of 0x20A0 into the cache memory. Subsequently, the processing unit determines that the memory address of 0x20C0 exists in the cache way Way-2 of the cache memory, and therefore, the processing unit would not write the memory address 0x20C0 into the Way-2 once again. In the meantime, the processing unit abandons the data block corresponding to the memory address of 0x20C0.

Figure 2F:
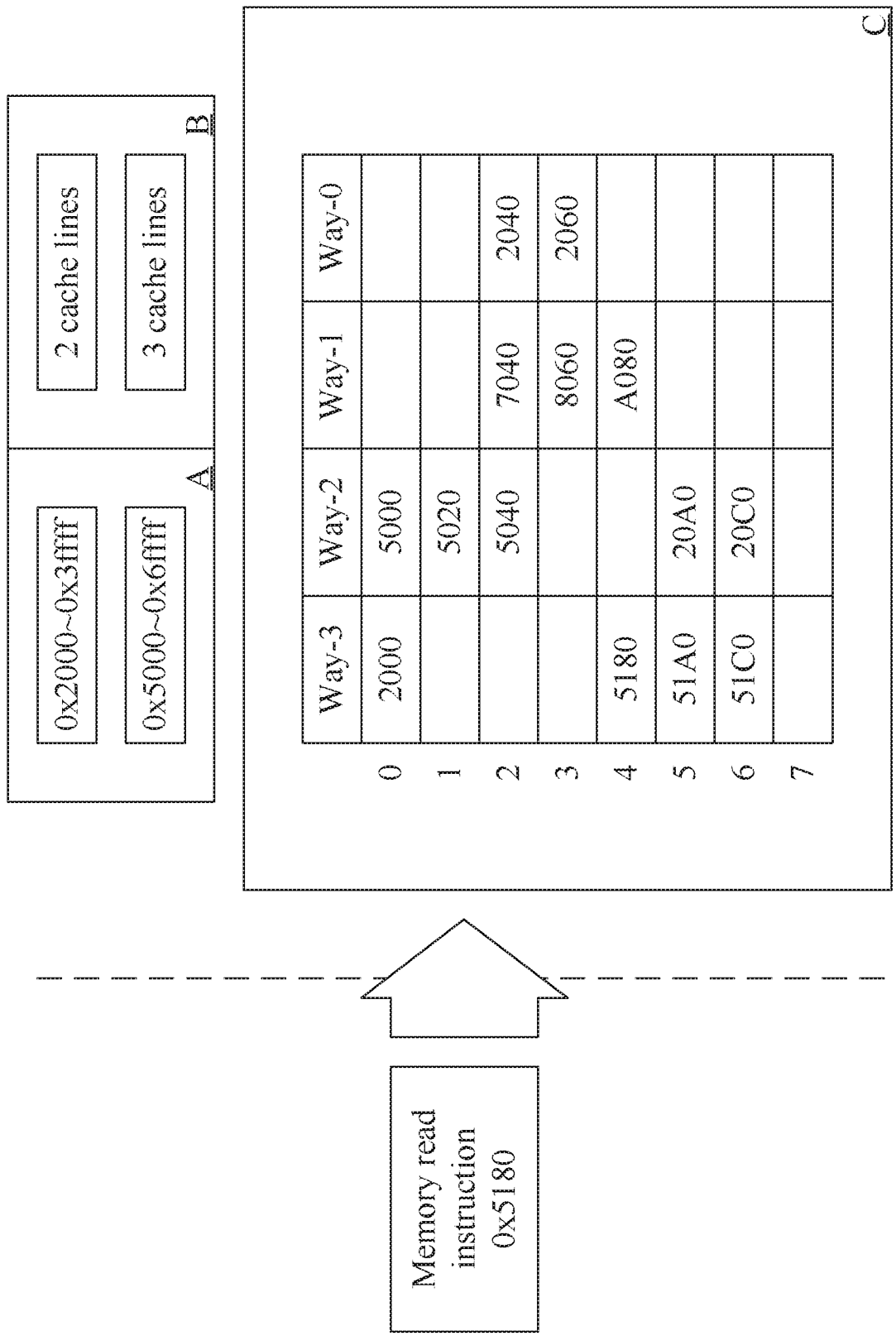

Please refer to FIG. 2F, in which the memory read instruction includes the memory address of 0x5180, and the processing unit determines that the memory address 0x5180 is within the memory address range of 0x5000 to 0x6ffff. Hence, the processing unit reads the data block having the data access amount of three cache lines at the memory address 0x5180 of the memory. This data block can be divided into the data having a start address of 0x5180 and the size of one cache line, the data having a start address of 0x51A0 and the size of one cache line, and the data having a start address of 0x51C0 and the size of one cache line.

Then, the processing unit selects the cache way Way-3, and writes the corresponding memory address of 0x5180 into the Way-3. In the meantime, the processing unit writes the data block corresponding to the memory address of 0x5180 into the cache memory. Subsequently, the processing unit determines that the memory address of 0x51A0 exists in the cache way Way-0 of the cache memory; then, after the processing unit further determines that the selected cache way Way-3 is different from the memory address of 0x51A0 existing in the cache way Way-0 of the cache memory, the processing unit clear the memory address of 0x51A0 of the cache way Way-0, and clears the corresponding cache line data. Then, the processing unit writes the corresponding memory address of 0x51A0 into the Way-3. In the meantime, the processing unit writes the data block corresponding to the memory address of 0x51A0 into cache memory.

Subsequently, the processing unit determines that the memory address of 0x51C0 does not exist in any a cache way of the cache memory, and hence, the processing unit writes the corresponding memory address of 0x51C0 into the Way-2. In the meantime, the processing unit writes the data block corresponding to the memory address of 0x51C0 into the cache memory.

Figure 3:
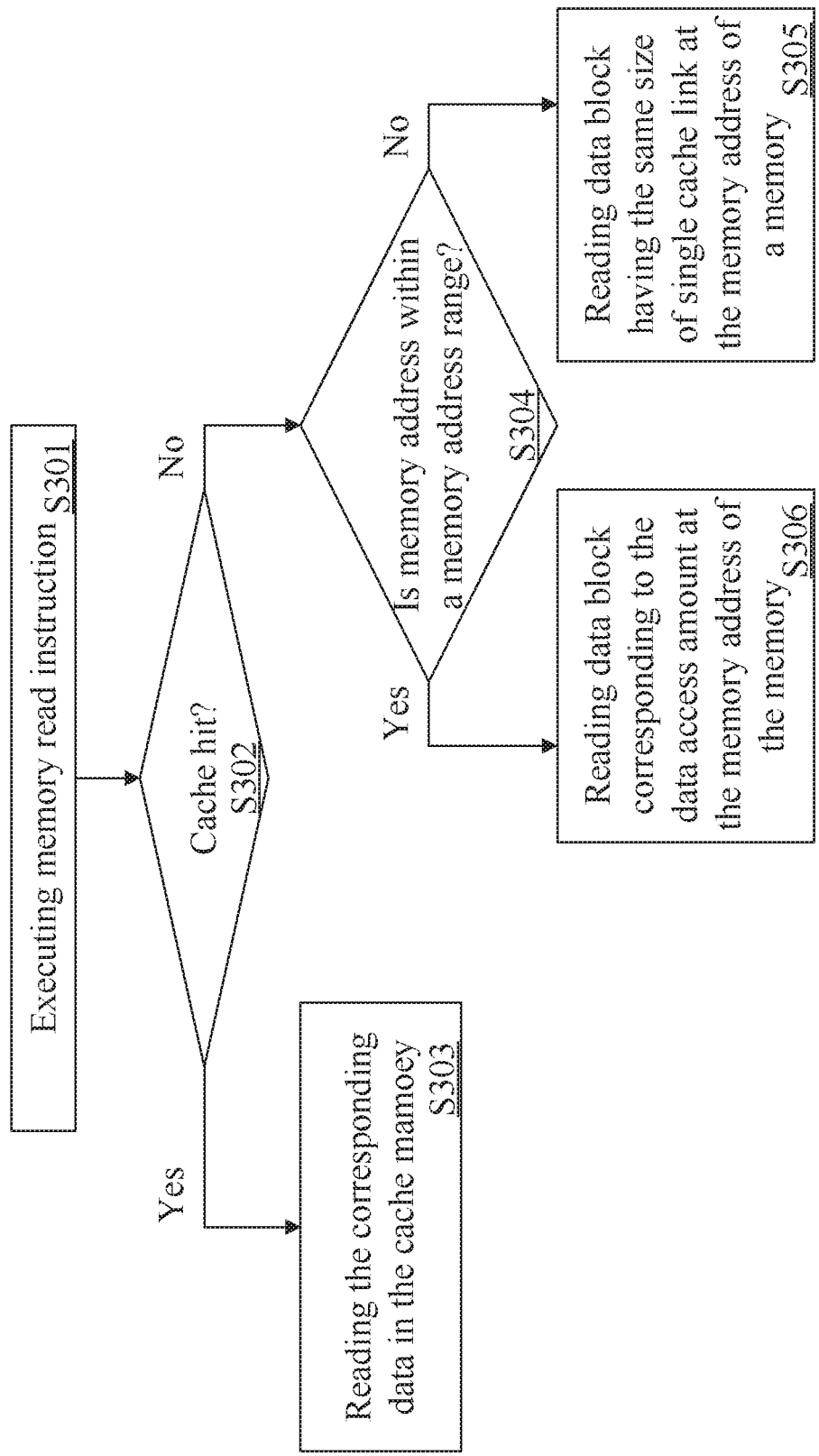
FIG. 3 is a flowchart diagram of a memory data access method according to some embodiments of the present invention.

Some embodiments of the present invention include a memory data access method, and the process flow thereof is shown in FIG. 3. The memory data access method of these embodiments is implemented by a memory data access apparatus (such as the memory data access apparatus 10 of the above-mentioned embodiments). Detailed operations of such methods are provided below.

First, step S301 is executed to execute a memory read instruction. In this case, the memory read instruction includes a memory address. Then, step S302 is executed to determine whether the memory address is a hit in a cache memory read. If yes, then step S303 is executed to read the corresponding data in the cache memory. If it is a cache miss, then step S304 is executed to determine whether the memory address is within a memory address range. In this case, the memory address range corresponds to a data access amount.

If the memory address is not within the memory address range, then step S305 is executed to read the data block having the size of a single cache line at the memory address of a memory. If the memory address is within the memory address range, then step S306 is executed to read the data block corresponding to the data access amount at the memory address of the memory.

Figure 4A:
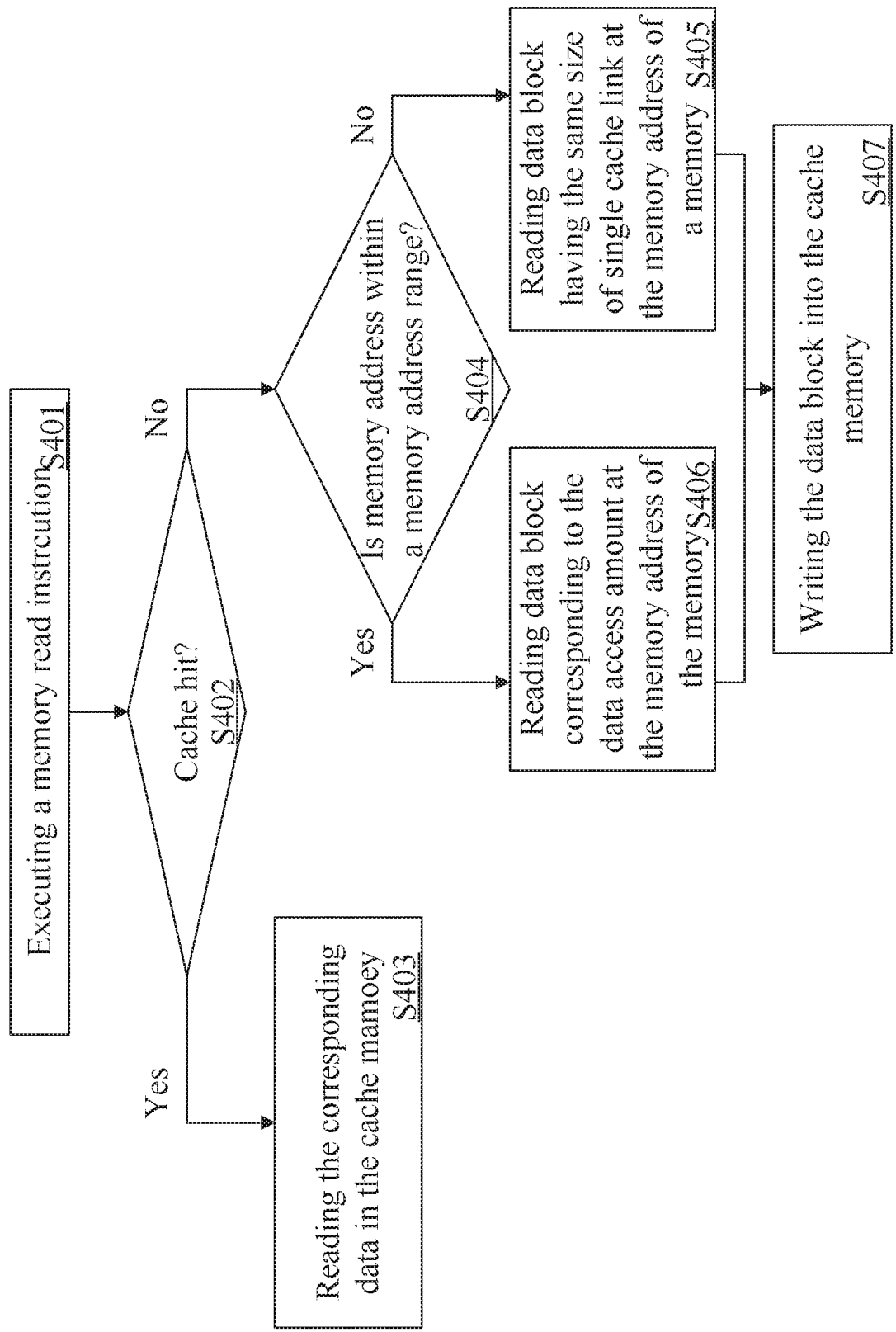
FIGS. 4A and 4B are flowchart diagrams of a memory data access method according to some embodiments of the present invention.
Figure 4B:
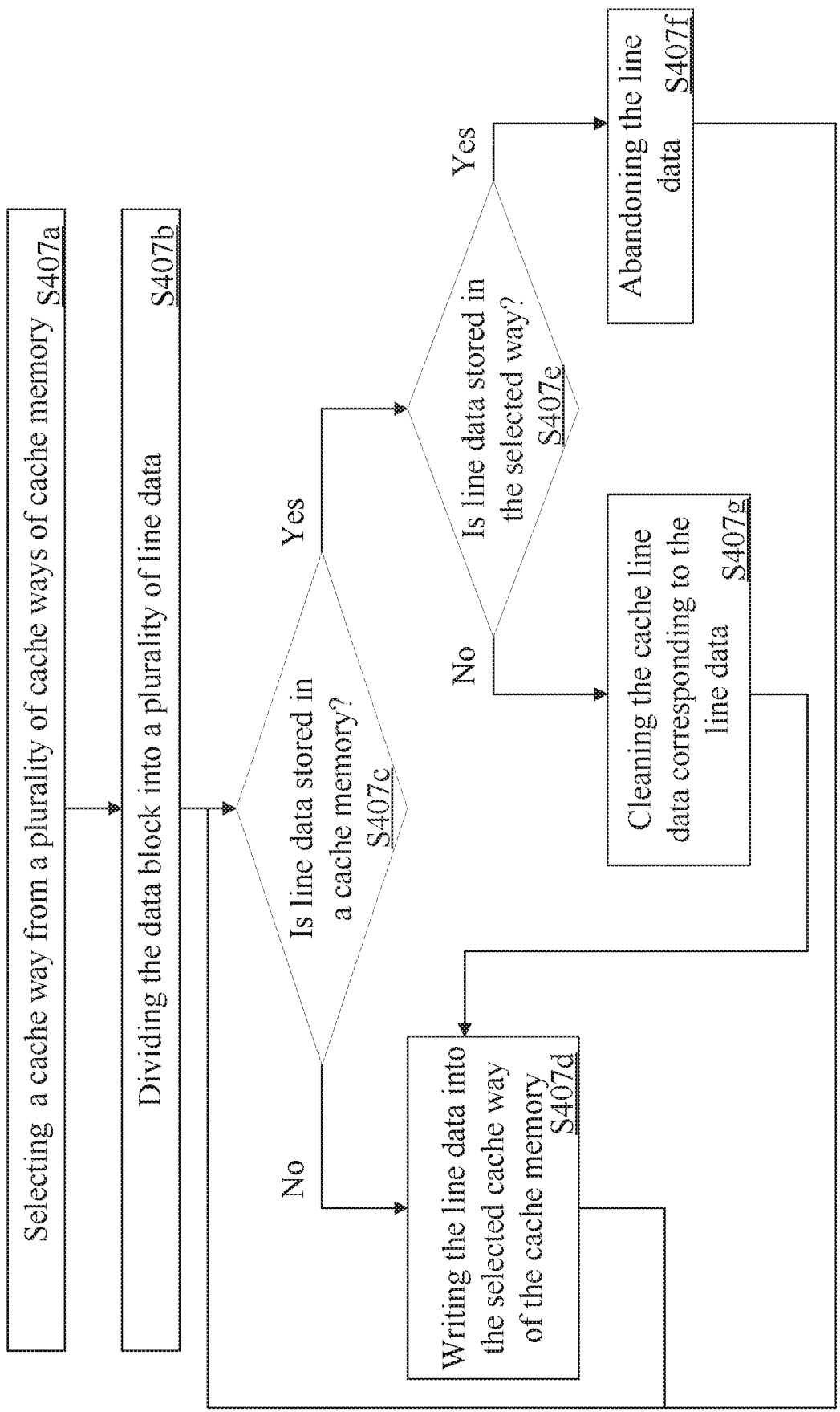

Some embodiments of the present invention include a memory data access method, and the process flow thereof is shown in FIGS. 4A and 4B. The memory data access method of these embodiments is implemented by a memory data access apparatus (such as, memory data access apparatus 10 of the above-mentioned embodiments). Detailed operations of the method are provided below.

First, step S401 is executed to execute a memory read instruction. In this case, the memory read instruction includes a memory address. Next, step S402 is executed to determine whether the memory address is a hit in a cache memory read. If yes, step S403 is executed to read the corresponding data in the cache memory. If it is a cache miss, step S404 is executed to determine whether the memory address is within a memory address range. In this case, the memory address range corresponds to a data access amount.

If the memory address is not within the memory address range, step S405 is executed to read a data block having the size of a single cache line at the memory address of a memory. Step S407 is executed to write this data block into the cache memory. If the memory address is within the memory address range, then step S406 is executed to read the data block corresponding to the data access amount from the memory address of the memory. Step S407 is executed to write this data block into the cache memory.

In some embodiments, step S407 can be further divided into the operations described in FIG. 4B. Specifically, step S407a is executed to select a cache way from a plurality of cache ways of the cache memory for storing data. Step S407b is executed to divide the data block into a plurality of line data. In this case, the size of each line data is the same as the size of a cache line.

For each line data, step S407c is executed to determine whether this line data is stored in a cache memory; in other words, whether it matches one of the cache line data of the cache memory. If not, step S407d is executed to write this line data into the selected cache way of the cache memory, and step S407c is repeatedly executed for the next line data. If yes, step 407e is executed to determine whether this line data is stored in the selected cache way of the cache memory.

If it is determined that this line data is stored in the selected cache way of the cache memory, then step S407f is executed to abandon the line data, and step S407c is repeatedly executed for the next line data. If it is determined that this line data is stored in another cache way of the cache memory, then step S407g is executed to clean the cache line data, in the cache memory, corresponding to this line data. Then, step S407d is executed to write this line data into the selected cache way of the cache memory, and step S407c is repeatedly executed for the next line data. Step S407c to step S407g are repeated until all the line data are processed.

It should be noted that in some embodiments, in the above mentioned memory data access apparatus, the processing unit includes logic circuit such as central processing units (CPUs) capable of carrying out computation and instructions, compared with the cache memory, a general memory includes the memory (Random Access Memory, RAM) having a slower access speed; however, this is not a limitation to the embodiments of the implementations of the hardware components of the present invention.

In some embodiments, the cache memory includes a Level 1 cache memory (L1 Cache memory). In some embodiments, the cache memory includes a Level 2 cache memory (L2 Cache memory). In some embodiments, the register may be a built-in register of the processing unit; however, this is not a limitation to the embodiments of the implementations of the hardware components of the present invention.

While this invention has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the invention by simply employing the elements of the independent claims. Accordingly, embodiments of the invention as set forth herein are intended to be illustrative, not limiting. Various changes may be made without departing from the spirit and scope of the invention.

What is claimed is:

1. A memory data access method, comprising:

executing a memory read instruction, wherein the memory read instruction comprises a memory address;

determining that access of the memory address in the cache memory is missed;

after determining that access of the memory address in the cache of memory is missed, determining that the memory address is within a pre-determined memory address range, wherein the pre-determined memory address range corresponds to a data access amount;

reading a data block corresponding to the data access amount from the memory address of a memory;

selecting a cache way from a plurality of cache ways of the cache memory;

dividing the data block into a plurality of line data, wherein size of each line data is the same as size of a cache line; and writing at least one of the plurality of line data into the selected cache way.

2. The memory data access method of claim 1, wherein step of writing at least one of the plurality of line data into the selected cache way further comprises:

determining that a first line data of the plurality of line data is not stored in the cache memory; and writing the first line data into the selected cache way.

3. The memory data access method of claim 2, further comprising:

determining that a second line data of the plurality of line data matches a cache line data of the cache memory;

determining that the second line data is not stored in the selected cache way;

cleaning the cache line data of the cache memory; and writing the second line data into the selected cache way.

4. The memory data access method of claim 2, further comprising:
- determining that a second line data of the plurality of line data matches a cache line data of the cache memory;
- determining that the second line data is stored in the selected cache way; and
- abandoning the second line data.

5. The memory data access method of claim 1, wherein the pre-determined memory address range and the corresponding data access amount are stored in at least one register.

6. The memory data access method of claim 5, wherein the at least one register comprises a first register and a second register, the pre-determined memory address range is stored in the first register, and the corresponding data access amount is stored in the second register.

7. The memory data access method of claim 1, wherein the data access amount is at least twice size of one cache line.

8. The memory data access method of claim 1, wherein the memory includes Random Access Memory.

9. A memory data access apparatus, comprises:
- a cache memory; and
- a processing unit, electrically coupled to the cache memory, and configured to:
  - execute a memory read instruction, wherein, the memory read instruction comprises a memory address;
  - determine that the memory address cache miss in the cache memory read;
  - after determining that the memory address cache miss in the cache memory read, determine that the memory address is within a pre-determined memory address range, wherein, the pre-determined memory address range corresponds to a data access amount;
  - read a data block corresponding to the data access amount from the memory address of a memory;
  - select a cache way from a plurality of cache ways of the cache memory;
  - divide the data block into a plurality of line data, wherein size of each line data is the same as size of a cache line; and
  - write at least one of the plurality of line data into the selected cache way.

10. The memory data access apparatus of claim 9, wherein the processing unit is further configured to:
- determine that a first line data of the plurality of line data is not stored in the cache memory; and
- write the first line data into the selected cache way.

11. The memory data access apparatus of claim 10, wherein the processing unit is further configured to:
- determine that a second line data of the plurality of line data matches a cache line data of the cache memory;
- determine that the second line data is not stored in the selected cache way;
- clean the cache line data of the cache memory; and
- write the second line data into the selected cache way.

12. The memory data access apparatus of claim 10, wherein the processing unit is further configured to:
- determine that a second line data of the plurality of line data matches a cache line data of the cache memory;
- determine that the second line data is stored in the selected cache way; and
- abandon the second line data.

13. The memory data access apparatus of claim 9, further comprises:
- at least one register, electrically coupled to the processing unit and configured to store the pre-determined memory address range and the corresponding data access amount.

14. The memory data access apparatus of claim 13, wherein the at least one register comprises a first register and a second register, the pre-determined memory address range is stored in the first register, and the corresponding data access amount is stored in the second register.

15. The memory data access apparatus of claim 9, wherein the data access amount is at least twice size of one cache line.

16. The memory data access apparatus of claim 9, wherein the memory includes Random Access Memory.

* * * * *